Nov. 2, 1965 T. B. O'CONNELL ETAL 3,215,544

COMPOSITIONS FOR SEALING HOLES IN GLASS

Filed Oct. 18, 1962

INVENTORS
Thomas B. O'Connell,
BY Alfred E. Badger and
Donald E. Shamp

Nobbe & Swope
ATTORNEYS

3,215,544
COMPOSITIONS FOR SEALING HOLES IN GLASS
Thomas B. O'Connell, Toledo, Alfred E. Badger, Maumee, and Donald E. Shamp, Millbury, Ohio, assignors to Libbey-Owens-Ford Glass Company, Toledo, Ohio, a corporation of Ohio
Filed Oct. 18, 1962, Ser. No. 232,664
6 Claims. (Cl. 106—47)

This application is a continuation-in-part of our copending application Serial No. 847,629, filed October 20, 1959, now abandoned.

This invention relates to compositions for sealing holes in glass; and more particularly, to sealing dehydration holes in all-glass multiple sheet glazing units.

All-glass multiple sheet glazing units are well known and have been widely used in windows in domestic and industrial buildings. They are characterized by having two or more sheets of glass arranged in parallel face-to-face relationship, separated by a dehydrated air space that is enclosed around the perimeter of the unit in a suitable manner. The dehydrated air space forms an excellent heat barrier and greatly reduces loss of heat from within the building as compared to a window consisting of a single sheet of glass.

One of the most recent developments in this field has been the introduction into rather wide commercial use of the so-called all-glass type of multiple sheet glazing unit in which the sealed edge of the unit is formed by softening and fusing together the marginal edge portions of the glass sheets making up the unit, to produce a glass-to-glass hermetic seal around their perimeters.

During the production of the all-glass units, a dehydration hole is formed in the seal by inserting a metal tube into the seal while it is still softened, shortly after formation. The unit is dehydrated through this opening. After the dehydration operation, it is necessary to seal the opening to preserve the dehydrated condition within the unit.

Accordingly, it is an important object of the present invention to provide a sealed, all-glass multiple sheet glazing unit.

Another object is to provide a novel glass solder for sealing holes in glass.

A further object is to provide a novel composition for sealing holes in glass.

Other objects and advantages of the invention will become more apparent during the course of the following description, when taken in connection with the accompanying drawings.

In the drawings, wherein like numerals are employed to designate like parts throughout the same:

Figure 1:
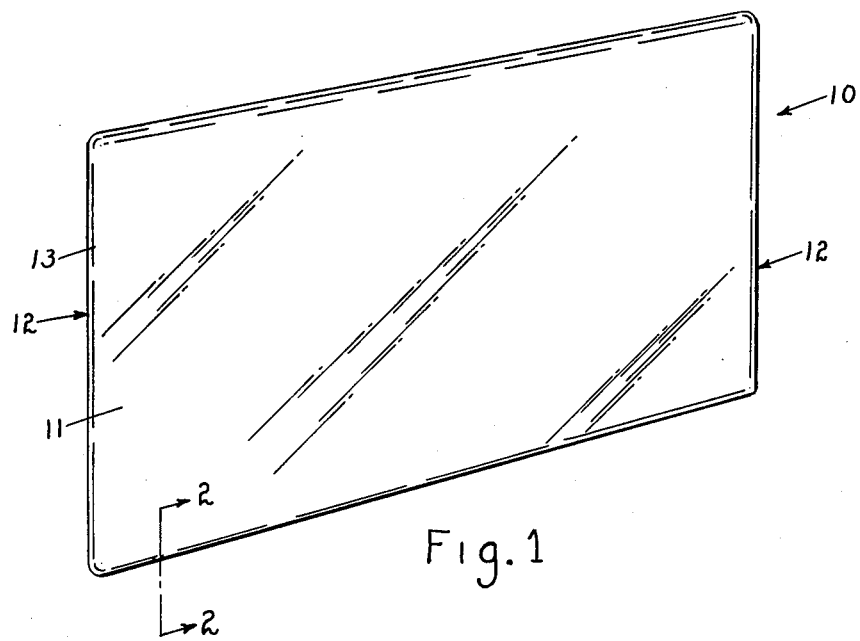
FIG. 1 is a perspective view of a multiple sheet all-glass glazing unit produced in accordance with the present invention.

As shown in the drawings, and particularly in FIG. 1, an all-glass multiple sheet glazing unit 10 comprises spaced, parallel sheets of glass 11. The sheets of glass 11 are sealed around their perimeters 12 by softening and fusing together the marginal edge portions of the glass sheets to produce a glass-to-glass hermetic seal 13 around their perimeters and enclosing an air space 14 between the sheets.

Figure 2:
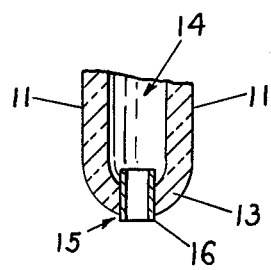
FIG. 2 is a section view taken along the line 2—2 of FIG. 1 of an unsealed glazing unit having a dehydration hole formed therein.
Figure 3:
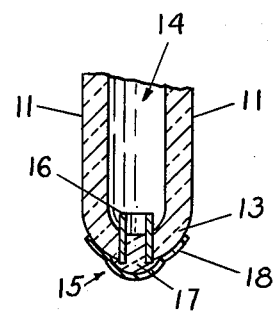
FIG. 3 is a view similar to FIG. 2 showing the dehydration hole plugged in accordance with the present invention.

As shown in FIG. 2, the dehydration hole 15 is suitably formed by inserting a short length of metal tubing 16 into the hermetic seal 13 while the seal is in a softened condition, shortly after its formation. As previously mentioned, the air space 14 between the sheets is dehydrated through this opening 15. After the dehydrating operation, to preserve the dehydrated condition of the air space 14, either the novel glass solder or the novel sealing composition made in accordance with this invention is applied over the exterior of the dehydration hole as shown at 17 in FIG. 3. Further, in accordance with the present invention, if desired, the exposed surface of the glass solder or sealing compound may be coated with a suitable synthetic resin varnish as indicated by the numeral 18.

Metals to which either the glass solder or the soldering composition of the present invention adhere include stainless steel, iron, zinc (galvanized iron), lead and others. Accordingly, the grommets can be made of any of these if desired.

Figure 4:
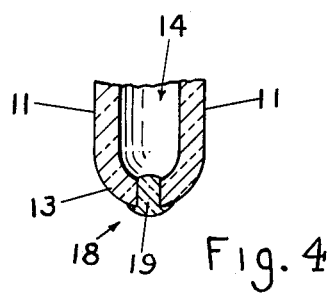
FIG. 4 is a section view showing a naked dehydration hole in an all-glass, multiple sheet glazing unit, sealed in accordance with the present invention.

Of course, either the solder or the sealing composition adhere to glasses of all kinds. Accordingly, it is within the scope of the present invention to seal holes in glass. FIG. 4 of the drawings illustrates a naked hole 18 in an all-glass multiple sheet glazing unit having a plug 19 of glass solder or sealing composition of the invention placed therein. The plug slightly overlaps the surface of the hole for added strength and insures a careful seal.

The low melting solder of this invention comprises broadly a mixture of silver oxide with lead and/or cadmium oxides, and $P_2O_5$. For example, very satisfactory results have been obtained through the use of a glass solder containing 20 to 75 percent by weight of $Ag_2O$, 0 to 35 percent by weight of an oxide selected from the group consisting of PbO, ZnO, CdO and mixtures thereof, and 25 to 55 percent by weight of $P_2O_5$.

The sealing composition is made by adding $SiO_2$ in the form of powdered, fused quartz glass to the glass solder, to serve as an inert filler. The powdered quartz glass has a very low thermal expansion coefficient and its presence as a filler decreases the over-all expansion of the composition and prevents cracking of the seal. Since the fused quartz glass is merely suspended in the matrix solder, the composition is opaque. It has been found that a very satisfactory glass sealing composition results from the addition of $SiO_2$, as fused quartz glass, to the glass solder in an amount from 35 to 45 percent based on the weight of the glass solder.

The following compositions are given as examples of low melting glass solders in accordance with the present invention:

*Solder No. 1*

| | Percent by weight |
|---|---|
| $Ag_2O$ | 54.5 |
| PbO | 9.0 |
| $P_2O_5$ | 36.5 |
| ZnO | 0 |
| CdO | 0 |

*Solder No. 2*

| | Percent by weight |
|---|---|
| $Ag_2O$ | 41.0 |
| PbO | 9.0 |
| $P_2O_5$ | 50.0 |
| ZnO | 0 |
| CdO | 0 |

*Solder No. 3*

| | Percent by weight |
|---|---|
| $Ag_2O$ | 35.0 |
| PbO | 25.0 |
| $P_2O_5$ | 40.0 |
| ZnO | 0 |
| CdO | 0 |

Solder No. 4

| | Percent by weight |
|---|---|
| $Ag_2O$ | 60.0 |
| PbO | 0 |
| $P_2O_5$ | 40.0 |
| ZnO | 0 |
| CdO | 0 |

Solder No. 5

| | Percent by weight |
|---|---|
| $Ag_2O$ | 54.0 |
| PbO | 0 |
| $P_2O_5$ | 37.0 |
| ZnO | 9.0 |
| CdO | 0 |

Solder No. 6

| | Percent by weight |
|---|---|
| $Ag_2O$ | 53.0 |
| PbO | 0 |
| $P_2O_5$ | 32.5 |
| ZnO | 0 |
| CdO | 14.5 |

The above solders were prepared from batches consisting of the following ingredients, the batches being numbered 1 through 6 corresponding to the examples of solders set forth above:

Batch No. 1

| | Amount | Parts by Weight |
|---|---|---|
| $Ag_2O$ | 15.51 gm | 15.51 |
| $Pb_3O_4$ | 2.62 gm | 2.62 |
| $H_3PO_4$ (85%) | 10.0 cc | 16.9 |
| ZnO | 0 | 0 |
| CdO | 0 | 0 |

Batch No. 2

| | Amount | Parts by Weight |
|---|---|---|
| $Ag_2O$ | 11.68 gm | 11.68 |
| $Pb_3O_4$ | 2.62 gm | 2.62 |
| $H_3PO_4$ (85%) | 13.7 cc | 23.2 |
| ZnO | 0 | 0 |
| CdO | 0 | 0 |

Batch No. 3

| | Amount | Parts by Weight |
|---|---|---|
| $Ag_2O$ | 10.00 gm | 10.00 |
| $Pb_3O_4$ | 7.28 gm | 7.28 |
| $H_3PO_4$ (85%) | 11.0 cc | 18.6 |
| ZnO | 0 | 0 |
| CdO | 0 | 0 |

Batch No. 4

| | Amount | Parts by Weight |
|---|---|---|
| $Ag_2O$ | 17.15 gm | 17.15 |
| $Pb_3O_4$ | 0 | 0 |
| $H_3PO_4$ (85%) | 11.0 cc | 18.6 |
| ZnO | 0 | 0 |
| CdO | 0 | 0 |

Batch No. 5

| | Amount | Parts by Weight |
|---|---|---|
| $Ag_2O$ | 15.40 gm | 15.40 |
| $Pb_3O_4$ | 0 | 0 |
| $H_3PO_4$ (85%) | 10.12 cc | 17.10 |
| ZnO | 2.57 | 2.57 |
| CdO | 0 | 0 |

Batch No. 6

| | Amount | Parts by Weight |
|---|---|---|
| $Ag_2O$ | 15.10 gm | 15.10 |
| $Pb_3O_4$ | 0 | 0 |
| $H_3PO_4$ (85%) | 8.93 cc | 15.08 |
| ZnO | 0 | 0 |
| CdO | 4.14 | 4.14 |

Each of the foregoing glass solders was produced by admixing the corresponding batch ingredients and heating this mixture to about 500° F. at which temperature the constituents chemically interact. The interacted mass was then cooled to a usable form.

Sealing compositions may be prepared in accordance with the invention by adding to the glass solders, while the latter are in a molten state and at a temperature of about 500° F., 35 to 45 percent of $SiO_2$ based on the weight of the solder. Preferably, the $SiO_2$ is added to the molten solder in the form of powdered (−200 mesh) fused quartz glass. The molten solder and $SiO_2$ mixture is then heated to raise its temperature to about 600° F. and to maintain the mixture at this temperature for a soaking period of one-half hour. After the soaking period, the composition is poured into an easily usable form such as rods or the like and cooled.

The following compositions are given as examples of sealing compositions in accordance with the present invention:

Composition No. 1

| | Percent by weight |
|---|---|
| $Ag_2O$ | 39.3 |
| PbO | 6.5 |
| $P_2O_5$ | 36.3 |
| $SiO_2$ | 27.9 |

Composition No. 2

| | Percent by weight |
|---|---|
| $Ag_2O$ | 41.2 |
| PbO | 6.8 |
| $P_2O_5$ | 27.6 |
| $SiO_2$ | 24.4 |

Composition No. 3

| | Percent by weight |
|---|---|
| $Ag_2O$ | 37.4 |
| PbO | 6.2 |
| $P_2O_5$ | 25.0 |
| $SiO_2$ | 31.4 |

The above-identified sealing compositions were prepared from batches consisting of the following ingredients; here again, the batches being numbered 1 through 3 and corresponding to the examples of sealing compositions set forth above:

Batch No. 1

| | Amount | Parts by Weight |
|---|---|---|
| $Ag_2O$ | 11.22 gm | 11.22 |
| $Pb_3O_4$ | 1.89 gm | 1.89 |
| $H_3PO_4$ (85%) | 10.0 cc | 16.9 |
| $SiO_2$ | 7.95 gm | 7.95 |

(40% of Glass)

Batch No. 2

| | Amount | Parts by Weight |
|---|---|---|
| $Ag_2O$ | 11.72 gm | 11.72 |
| $Pb_3O_4$ | 1.98 gm | 1.98 |
| $H_3PO_4$ (85%) | 7.65 cc | 12.9 |
| $SiO_2$ | 6.96 gm | 6.96 |

(35% of Glass)

*Batch No. 3*

| | Amount | Parts by Weight |
|---|---|---|
| $Ag_2O$ | 10.67 gm | 10.67 |
| $Pb_3O_4$ | 1.80 gm | 1.80 |
| $H_3PO_4$ (85%) | 6.86 cc | 11.60 |
| $SiO_2$ | 8.95 gm | 8.95 |
| | | (45% of Glass) |

In each instance, the sealing composition was prepared from the batch materials by the method outlined above. Thus, in each case, the batch ingredients were admixed and heated to about 500° F. at which temperature the batch ingredients are molten and chemically interact to produce a glass solder. The fused quartz glass was then added to the molten solder and the temperature raised to 600° F. and maintained at this temperature for the specified soaking period. After the soaking period, the composition was poured into rod form.

All of the exemplary glass solders and sealing compositions exhibited a melting temperature of below 300° F. (approximately 275° F.) permitting the use of a conventional soldering iron to provide the necessary heat for sealing the dehydration holes in all-glass multiple sheet glazing units. Of course, any suitable heat source can be employed to soften the solder and composition of the present invention. In addition to the conventional soldering iron previously mentioned, a heated air jet, dielectric heating and others may be used.

In some instances, it may be desired to cover the exposed surface of the glass solder or the sealing composition with an abrasion and water-resistant coating. One suitable coating that may be employed is an alkyd-type synthetic resin varnish. Other synthetic resin varnishes also may be used. In some instances it may be desired to add powdered zinc to the coating to neutralize water vapor which may diffuse through it. This water vapor would form a film of phosphoric acid on the surface of the sealing glass. Reaction of phosphoric acid with zinc would form zinc phosphate and hydrogen, the latter diffusing outward.

A glass solder or sealing composition for use in plugging holes in all-glass, multiple sheet glazing units should have the following properties:

(1) It should be fluid at a low temperature preferably in the range from 300° to 400° F., to prevent thermal shock from cracking the unit.

(2) Its thermal expansion should be lower than the thermal expansion of window glass. This conclusion follows from the fact that the dimensions of the dehydration holes change only slightly, whereas the glass solder and sealing composition contract during cooling from their setting temperature to room temperature. This contraction tends to produce cracks in the plug produced by the glass solder or sealing composition.

(3) It should be durable and resistant to atmospheric attack for long periods.

In regard to thermal expansion, the glass solder and glass sealing composition of the present invention have very low flowing temperatures (less than 300° F.). Assuming that the setting temperature of the glass solder is about 200° F., the stress developed in the seal results from differential contraction through a small temperature interval (200° F. to room temperature). The contraction of the glass solder is reduced further by the addition of a finely powdered low-expansion material, such as fused quartz, Vycor glass, or amorphous silica. These additions cause the glass to become opaque, but the fluidity of the matrix solder is retained.

Inasmuch as the solder and sealing composition of the present invention adhere to both metals and glass, it is to be considered within the scope of the invention to use them to join these materials.

It will be understood that this invention is susceptible to modification in order to adapt it to different usages and conditions and accordingly, it is desired to comprehend such modifications within the scope of the appended claims.

We claim:

1. A composition for sealing holes in glass consisting of; a glass solder consisting essentially of 20 to 75 percent by weight of $Ag_2O$, 0 to 35 percent by weight of an oxide selected from the group consisting of PbO, ZnO, CdO and mixtures thereof, and 25 to 55 percent by weight of $P_2O_5$; and 35 to 45 percent of $SiO_2$ based on the weight of the solder, said $SiO_2$ being added as powdered, fused quartz glass.

2. A composition for sealing holes in glass consisting of; a glass solder consisting essentially of 54.5 percent by weight of $Ag_2O$, 9.0 percent by weight of PbO, and 36.5 percent by weight of $P_2O_5$; and 40 percent of $SiO_2$ based on the weight of the solder, said $SiO_2$ being added as powdered, fused quartz glass.

3. A method of producing a glass solder comprising admixing $Ag_2O$, $Pb_3O_4$, $H_3PO_4$ and an oxide selected from the group consisting of ZnO, CdO and mixtures thereof in proportions such that when the admixture is heated to about 500° F., it will interact to form a glass solder consisting essentially of 20 to 75 percent by weight of $Ag_2O$, 0 to 35 percent by weight of an oxide selected from the group consisting of PbO, ZnO, CdO and mixtures thereof, and 25 to 55 percent by weight of $P_2O_5$, heating said constituents to a temperature of about 500° F. to cause them to chemically interact, and cooling the interacted mass to usable form.

4. A method of producing a glass sealing composition, comprising admixing $Ag_2O$, $Pb_3O_4$, $H_3PO_4$ and an oxide selected from the group consisting of ZnO, CdO and mixtures thereof in proportions such that when the admixture is heated to about 500° F. it will interact to form a glass solder consisting essentially of 20 to 75 percent by weight of $Ag_2O$, 0 to 35 percent by weight of an oxide selected from the group consisting of PbO, ZnO, CdO and mixtures thereof, and 25 to 55 percent by weight of $P_2O_5$, heating said admixture to a temperature of about 500° F. to cause the constituents thereof to chemically interact, maintaining said temperature and adding to said glass solder 35 to 45 percent of powdered, fused quartz glass based on the weight of said solder, raising the temperature to about 600° F. for a period of one-half hour, and cooling the composition to a usable form.

5. A method of producing a glass solder comprising admixing $Ag_2O$, $Pb_3O_4$ and $H_3PO_4$ (85%) to form a composition consisting essentially of 15.51 parts by weight of $Ag_2O$, 2.62 parts by weight of $Pb_3O_4$ and 16.9 parts by weight of $H_3PO_4$ (85%), heating said composition to a temperature of about 500° F. to cause the constituents thereof to chemically interact and cooling the interacted mass to usable form.

6. A method of producing a glass sealing composition comprising admixing $Ag_2O$, $Pb_3O_4$ and $H_3PO_4$ (85%) to form a composition consisting essentially of 15.51 parts by weight of $Ag_2O$, 2.62 parts by weight of $Pb_3O_4$ and 16.9 parts by weight of $H_3PO_4$ (85%), heating said composition to a temperature of about 500° F. to cause the constituents thereof to chemically interact, maintaining said temperature and admixing 11 parts by weight of powdered (−200 mesh) fused quartz glass, raising the temperature to about 600° F. for a period of about one-half hour, and then cooling the composition to usable form.

References Cited by the Examiner

UNITED STATES PATENTS

| 1,654,404 | 12/27 | Blumenberg | 106—47 |
| 2,165,134 | 7/39 | Frank et al. | 106—48 |
| 2,751,477 | 6/56 | Fitzgerald | 106—52 |

TOBIAS E. LEVOW, *Primary Examiner.*

UNITED STATES PATENT OFFICE
CERTIFICATE OF CORRECTION

Patent No. 3,215,544　　　　　　　　　　　　　November 2, 1965

Thomas B. O'Connell et al.

It is hereby certified that error appears in the above numbered patent requiring correction and that the said Letters Patent should read as corrected below.

Column 2, line 29, after "and/or" insert -- zinc and/or --.

Signed and sealed this 9th day of August 1966.

(SEAL)
Attest:

ERNEST W. SWIDER
Attesting Officer

EDWARD J. BRENNER
Commissioner of Patents